3,047,527
COMPOSITION COMPRISING POLYMERIC REACTION PRODUCT OF AMMONIACAL COMPOUND AND A HALOSILANE AND A HYDROXYL-CONTAINING FILLER
Hyman M. Molotsky, Chicago, William M. Boyer, Tinley Park, and Harlan E. Tarbell, Jr., Elmhurst, Ill., assignors to The Richardson Company, Melrose Park, Ill., a corporation of Ohio
No Drawing. Filed Nov. 10, 1958, Ser. No. 772,718
22 Claims. (Cl. 260—37)

This invention is concerned with new moulding compositions and, more particularly, with molding compositions which include an inorganic filler containing hydroxyl groups and a resinous binder containing silicon-nitrogen linkages.

As is disclosed in a number of patents to Nicholas D. Cheronis, such as Patent 2,579,418, dated December 18, 1951, a particular class of compositions may be prepared by reacting ammonia or a primary amine with a halosilane. Such a reaction results in replacing the halogen atom attached directly to a silicon atom with an amino group. The halosilanes may be represented, in general, by the generic formula $$R_nSiHal_{4-n}$$

wherein "R" is an organic radical, such as an alkyl, aryl, allyl, or alkoxy group, and the like. "Hal" represents halogen and "n" is a number from 0-3. The halogen preferably used is chlorine. The resulting reaction products are understood to have the following general formula $$R_nSi(NH_2)_{4-n} \text{ or } R_nSi(NHR')_{4-n}$$

depending on whether the reaction initially involved ammonolysis or aminolysis. The foregoing reactions are normally conducted at room temperature or below in the presence of an inert solvent and in the absence of water to prevent hydrolysis.

In many instances, the number of replaceable halogen atoms attached directly to the silicon atom and the number of amino groups substituted for such atoms is referred to in terms of functionality. For example, if the halosilane contains one replaceable halogen atom, such a halosilane would be referred to as monofunctional. The resultant ammonolysis or aminolysis reaction products would also be referred to as monofunctional. Likewise, a halosilane having two, three, or four replaceable halogen atoms would be referred to as being di, tri, or tetrafunctional compounds, respectively, as would their corresponding ammonia or primary amine reaction products.

The ammonolysis or aminolysis of a monofunctional halosilane results in the substitution of a single amino group for the one replaceable halogen atom, such a product being stable and not capable of further reaction with itself. However, it has been noted that many of the higher functional ammonolysis or aminolysis reaction products of the coresponding halosilanes tend to undergo polymerization at room temperature, forming either liquids or solids, depending on the particular starting materials. In fact, in many instances, it is difficult, if not impossible, to isolate monomers of such reaction products. As indicated in the aforementioned patent to Cheronis, the ammonolyzed or aminolyzed polymeric reaction products are characterized by the presence of an

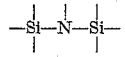

linkage as part of the molecular structure.

It is believed that the polymerization of the higher functional halosilane derivatives occurs by means of a condensation reaction with the liberation of ammonia. Polymerization reactions involving difunctional products, particularly those containing alkyl groups, tend to form cyclic trimers or tetramers, whereas polymerization reactions involving the higher functional silicon-nitrogen compounds tend to form straight or branched chain polymers which, in a number of cases, are believed to consist of a plurality of linked cyclic trimers or tetramers. When mixtures of halosilanes of different functionality, which may also include different organic groups, are ammonolyzed or aminolyzed, mixtures of separate polymers or copolymers hybrids may be formed, depending upon the type of halosilanes used.

Certain distinctions may be made with respect to ammonolysis as compared to aminolysis in that in the latter type of a reaction, there is less of a tendency for the reaction products to polymerize to the extent that shorter polymers may be produced. Hence, a certain degree of control of end products can be obtained by appropriate selection of the initial reactants. Reaction products of ammonia or amines with halosilanes, and particularly the aforementioned polymers, are sometimes referred to as "silamines" or "aminosilanes." The former term will, at times, be used in this specification.

Silamines, in many instances, may be used directly without further modification to form films, coatings, or molded products. In addtion, the silamines may be modified to obtain additional properties desired in an end product or may be used as modifying agents for other compounds. In the copending application of Shultz et al., Serial No. 670,631, filed July 9, 1957, now abandoned in favor of the continuation-in-part application, Serial No. 807,975, there has been disclosed and claimed the use of silamines to modify or cure epoxy resins. In the copending application of Boyer et al., Serial No. 771,239, filed November 3, 1958, now U.S. 3,036,019, there has been disclosed and claimed the modification of certain silamines with amines. In another copending application of Boyer et al., Serial No. 775,350, there has been disclosed and claimed new compositions derived from the reaction of silamines with polyhydroxy organic compounds.

The present invention is directed to the production of molding compositions containing, as the principal binder, silamines or silamine-epoxy compostions, together with hydrated inorganic fillers or, more specifically, inorganic fillers containing hydroxyl groups. These new compositions enable molding of a variety of articles having improved properties, such as flexural strength and heat distortion. More particularly, this invention is directed to molding compositions of this type wherein the principal binder is di, tri, or tetrafunctonal silamines and mixtures or hybrids of these silamines, either alone or in combination with an epoxy component.

As previously indicated, higher functional ammonolysis or aminolysis reaction products of halosilanes, in many instances, are found to polymerize simultaneously upon or immediately subsequent to formation. The polymerized trifunctional silamines are considered to be represented, generally, by the formula:

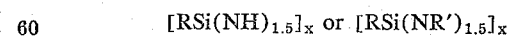

In the above formula, "R," which was present in the parent halosilane, designates an organic group ttached to the silicon atom, of which the following groups are illustrative: (alkyl)-methyl, ethyl, lauryl, isopropyl, tertiary butyl, cyclopropyl, cyclohexyl, and substituted alkyl groups, such as 2-chloroethyl, beta-trichlorosilylethyl; (aryl)-phenyl, alpha or beta-naphthyl and substituted aryl groups, such as para-chlorophenyl, para-trichlorosilylphenyl; (aralkyl)-phenethyl; and unsaturated groups (alkenyl) vinyl and allyl, (alkynyl) ethynyl. Also contemplated are organic groups, such as (alkylthio) methylthio, ethylthio; (arylthio) phenylthio; and radicals derived from secondary amines, for example, dimethylamino, diethylamino, methylphenylamino. Preferably, "R" is either a monovalent alkyl or aryl group, as these groups have been found, at least at the present time, to have the best stability, especially with respect to hydrolysis.

"R'" designates an organic group derived from a primary amine if the basic reaction involves aminoylsis, illustrative amines being alkyl amines, such as methylamine, and ethylamine; allylamine; ethylenediamine; hexamethylenediamine; aryl amines, for example, aniline and para-phenylenediamine; and alkaryl amines like benzylamine.

The number "1.5" in the above formulas indicates that each repeating unit of the polymer contains, on the average, one and one-half nitrogen atoms for each silicon atom in the unit and, correspondingly, one organic group attached to the silicon atom. This type of repeating unit may be compared to the corresponding unit of a polymerized difunctional silamine wherein each unit, on the average, contains one nitrogen atom and two organic groups attached to each silicon atom. The difunctional silamines may contain organic groups of the same type as is represented by "R," in the aforementioned trifunctional formula, and may also be formed from the same amines as cited in connection with the trifunctional compounds. Tetrafunctional silamines derived from, for example, tetrachlorosilane, rapidly undergo a polymerization and, of course, have no associated organic groups. Hybrid copolymers will have intermediate ratios of organic groups vs. nitrogen atoms attached to silicon.

The chemical composition of the hydroxyl-containing inorganic fillers employed as a principal component of the present compositions is not completely understood, however, it is generally believed that such fillers contain hydroxyl groups which are chemically bound or attached to the molecules of the filler as well as hydrogen atoms, likewise, bound to the molecules, but not to the hydroxyl groups. Water thus bound up in a material is sometimes referred to as "water of constitution." Hydrated fillers of the type contemplated herein are to be distinguished from fillers which contain water in either a state known as "colloidal water" or a state known as "water of crystallization." Water which is present in the latter two states is usually not considered to be as closely associated with or chemically bound to the filler molecules.

Typical hydroxyl-containing inorganic materials contemplated as fillers are: asbestos, talc, mica, basic magnesium carbonate, clay, boric acid, and silicic acid. All of the foregoing fillers permit the formation of molding products having the improved properties claimed. However, certain of the fillers are to be preferred in that they enable attaining the upper range of properties which are characteristic of the present compositions. The preferred fillers have been found to be asbestos and mica. Asbestos, when serving as a filler, has the added advantage, because of its fibrous nature, of improving other physical properties of a particular molded article in addition to flexural strength and heat distortion, which are two of the more outstanding properties realized. For the production of products requiring good electrical properties and, particularly, power factor and arc resistance, mica has been found to give excellent results.

The hydroxyl-containing inorganic fillers and resinous binders as contemplated herein may be made-up into molding compositions wherein the filler comprises up to approximately eighty percent by weight of the total composition, with the resultant molding article having properties to the extent indicated.

Normally, in preparing a molding composition, the silamine or the silamine-epoxy binder, as hereinafter more fully disclosed, is first prepared and then mixed with the desired amount of filler. The composition is then placed in a mold and subjected to heat and pressure to form the article and cure the composition. It has been found, in general, that the present compositions require both heat and pressure to attain a final hard, dense material. In many instances, when heat and pressure are not used or when heat alone was used, the compositions, after allowance for a suitable curing period, will be found to lack cohesiveness and crumble easily. However, where the production of a molded product is not involved and, correspondingly, cohesiveness of the mass as a whole, the reaction of silamines or silamine-epoxy composition with, for example, a fibrous hydroxyl-containing filler may be of interest in forming a coating on the fibers.

The exact nature of the reaction involved between the filler and resinous binder is not clearly understood at the present time, however, it is believed to be a reaction wherein the hydroxyl groups of the filler enter into a chemical reaction with the amino groups of the silamine, whereby the binder and the filler are chemically united. This theory is partially supported by comparison of the properties characteristic of articles molded from the new compositions and articles molded from compositions using the same binder but having a filler which is not normally hydrated or which has been dehydrated. A chemical union between the binder and the filler, such as is believed takes place in the compositions of the present invention, is somewhat of an unsual phenomenon in that normal resin-filler compositions generally do not involve a reaction between the two when such compositions are subjected to cure, even under heat and pressure.

The silamines are usually prepared in a solvent and the solvent is retained during the preparation of a molding composition with the filler, especially where the silamines have a tendency to polymerize to a solid state. However, it has been found preferable to remove the solvent by a preliminary heat treatment of the composition prior to molding.

When compositions containing silamines and hydroxyl-containing inorganic fillers, as the two principal ingredients, are molded, evolution of ammonia usually occurs which is believed to be due, at least in part, to the reaction between the silamine and the filler. The evolution of ammonia presents somewhat of a problem with respect to molding compositions containing only silamines as a binder in that the ammonia, in escaping from the mass, will tend to make the mass porous or adversely affect its cohesiveness. Hence, some degree of care is required in molding such compositions. In practice, it may be desirable to provide "vented" molds to permit the escape of the ammonia developed.

The foregoing problem is substantially eliminated when a resinous binder is used comprising silamines and an epoxy resin. The elimination of the ammonia problem is believed to result from the fact that the nitrogen atoms, to a large extent, become chemically bound with the epoxy resin. Further evidence of this theory is presented in the aforementioned application of Shultz et al., Serial No. 807,975, which is concerned with the use of silamines as curing agents for epoxy resins wherein ammonia evolution as a result of the reaction involved is not considered to be a problem. Compositions containing silamines and epoxy resins as the binder together with hydroxyl-containing inorganic fillers have been found to give superior molded products, such compositions being capable of being molded in a closed mold under heat and pressure.

Epoxy compounds or resins which are contemplated as components of the present system are not, in general, limited to any particular epoxy compounds but may include any one of a variety of those products commercially available containing at least one but preferably two epoxy or ethylene oxide groups. Among the epoxy compositions which may be used are the epoxylated novolaks, usually formed by reacting epichlorohydrin with the normally-fusible condensation product of a phenol and an aldehyde. A commercially available composition of this type is sold by Dow Chemical Company under the trade designation "X2638-3." Epoxy resinous materials derived from epihalohydrins and bisphenols may, likewise, be used. Commercially available products of this type are sold by Shell Chemical Company as "Epon 828" and by Dow Chemical Company as "X2633-1," both of these compositions comprising predominantly the reaction product of bisphenol-A and epichlorohydrin. The reaction products of epichlorohydrin with polyhydroxyl phenols, such as novolaks and bisphenols, are frequently referred to as polyglycidyl ethers.

As further illustrating the invention but without intending to limit the same, the following examples are presented.

*Example I*

A silamine was initially prepared by ammonolyzing, with 5010 grams of liquid ammonia, a mixture of 898 grams of methyltrichlorosilane and 775 grams of dimethyldichlorosilane in a methylene chloride solution. Thirty-three parts of the resulting silamine, in the solvent, was added to 67 parts of asbestos floats and the solvent removed. The composition was then molded into a bar. Flow in the mold was good, however, the bar was apparently not fully cured. A portion of the bar was pressed between laminating plates under a pressure of twelve tons per square inch at a temperature of 165° C. for twenty minutes. A one inch disc was formed which was relatively hard.

*Example II*

A silamine was initially prepared by ammonolyzing, in a methylene chloride solution, dimethyldichlorosilane and phenyltrichlorosilane in equal molar proportions. A mixture, consisting of 16.7 parts of the silamine in solution of methylene chloride, was added to 83.3 parts of asbestos 4K28 (Johns-Manville Company). The mixture was heated in an air circulating oven at 160° C. for two and one-half minutes to remove the solvent. A one inch disc, molded under a pressure of two tons per square inch for twenty minutes at a temperature of 165° C., was found to be hard and fairly tough.

*Example III*

A mixture of 25 parts of a silamine (ammonolysis of phenyltrichlorosilane) in a methylene chloride solution was added to 25 parts of Dow Chemical Company epoxy resin "Epoxy X2633-1." Fifty parts of asbestos shorts were also added to the mixture, which was then heated in an air circulating oven at 130° C. for one and one-half minutes to remove the solvent. A bar was then molded under a pressure of about 1500 p.s.i. at 165° C. for twenty minutes. The bar was determined to have a heat distortion temperature of over 300° C. and a flexural strength of 9600 p.s.i.

*Example IV*

8.3 parts of the silamine of Example III were mixed with 8.3 parts of Shell Chemical Company "Epon 828" and 83.4 parts of asbestos 4K28 in methylene chloride. The mixture was air dried for fifteen minutes and heated in an air circulating oven at 160° C. for one minute to remove the solvent. An inch disc was molded under pressure of two tons p.s.i. at a temperature of 165° C. The disc was hard and tough.

*Example V*

A molding composition was prepared comprising 6 parts of asbestos floats, 16.7 parts of Epon 828 and 16.7 parts of a silamine prepared as described in Example II, the mixture being heated on a hot plate to remove the solvent. The composition was then molded into a bar at a pressure of about 1500 p.s.i. and a temperature of 165° C. As a result of tests, the bar was found to have a heat distortion temperature of better than 300° C. and a flexural strength of about 8250 p.s.i.

*Example VI*

A mixture of 16.7 parts of the silamine of Example I was mixed with 16.7 parts of Epon 828 and 66.7 parts of asbestos floats, the composition, after removal of solvent, was molded into a bar in the same manner as provided in Example V. Mold flow was good and a hard, tough bar was formed.

*Example VII*

55.5 parts of talc (pyrophyllite—R. T. Vanderbilt Company) was added to a mixture of Dow Epoxy X2633-1 and a silamine of the type used in Example III. The resulting bar which was molded in the manner used in the sample example was found to have a heat distortion temperature of 283° C. and a flexural strength of 4400 p.s.i.

*Example VIII*

45.4 parts of basic magnesium carbonate were added to a mixture of 27.3 parts of Epon 828 and 27.3 parts of a silamine of the type used in Example III. The resulting bar molded under a pressure of about 1500 p.s.i. at a temperature of 165° C. was found to have a heat distortion temperature of 280° C. and a flexural strength of 2100 p.s.i.

*Example IX*

A composition was prepared comprising the silamine of Example I, and an epoxy resin derived from Bisphenol-A epichlorohydrin, and asbestos floats (7M floats—Johns-Manville) in the ratio of 1-1-6 parts by weight, respectively. A bar, molded under a pressure of 1500 p.s.i. for twenty minutes at a temperature of 190° C., was found to have a flexural strength of 5200 p.s.i. By way of comparison, a similar bar was made from the same composition with, however, subjecting the asbestos filler to a preheat prior to use for twenty-four hours at 200° C. The resulting bar was found to have a flexural strength of 3000 p.s.i. As a further comparison, the asbestos floats, prior to incorporation into a similar composition, were given a preliminary heat treatment for one and one-half hours at 1000° C. The resulting composition would not cure in twenty-five minutes at 190° C. and under 4000 p.s.i.

*Example X*

A silamine was prepared by ammonolyzing in a methylene chloride solution a mixture of methyltrichlorosilane and dimethyldichlorosilane in a molar ratio of 4-1. A methylene chloride solution of the silamine with an epoxy resin was prepared containing one part of the silamine and one part of Jones-Dabney Epi Res 510 (corresponding to Epon 828). The mixture was heated to 125° C. to body the mixture and remove the solvent. Six parts of asbestos floats were then added and the components mixed in a Baker-Perkins mixer. A resulting composition was molded in a ¼" x 2" x 6" mold at a temperature of 165° under a total pressure of thirty tons for ten minutes. The molding operation yielded a bar having a heat distortion temperature of 349° C. The same bar was subjected to a post-cure of about seven hours at elevated temperatures which increased up to 200° C. Following the post-cure, the bar was found to have a heat distortion temperature in excess of 400° C., the deflection being .002" at this temperature. The bar was subjected to a heat aging for two hundred and twenty hours at 260° C. following which heat distortion tests were again conducted, the bar developing no deflection at 400° C.

*Example XI*

The same composition as used in Example X was molded in the same mold and under the same conditions with the exception that the molding time was of three minutes duration instead of ten minutes. Before subjecting the bar to a post-curing operation, it was found to have a flexural strength of 10,000 p.s.i. After subjecting the bar to the post-curing operation of Example X, the bar was found to have a flexural strength of 9940 p.s.i. Following the same heat aging, the bar was found to have a flexural strength of 7740 p.s.i.

*Example XII*

A mixture of silicon tetrachloride and dimethyldichlorosilane was ammonolyzed in a methylene chloride solution. One part by weight of the resulting silamine in methylene chloride solution was mixed with 1.43 parts by weight of Epi Res 510, the mixture being heated to 125° C. whereupon all of the solvent was removed. 7.1 parts by weight of asbestos floats were then added and the composition was mixed in a Baker-Perkins mixer. The composition was then molded, in a mold having the dimensions specified in Example X, for twenty minutes at 165° C. under a total pressure of thirty tons. The resulting bar was found to have a flexural strength of 7000 p.s.i. The bar was then subjected to a boiling water treatment for one hour, following which it was found to have a flexural strength of 5970 p.s.i.

*Example XIII*

One part by weight of the silamine of Example X was mixed with 1.2 parts by weight of Epi Res 510 in a methylene chloride solution. The solution was heated to 125° to drive off the solvent. To the resultant mixture was added 5.3 parts by weight of 3000 mesh steamed mica, 1.4 parts by weight of 160 mesh mica, 2.14 parts by weight of 100 mesh mica. After mixing the composition in a Baker-Perkins mixer, a bar was molded using the mold of Example X at a total pressure of thirty tons and a temperature of 165° C. for fifteen minutes. The resulting bar, after removal from the mold and before post-curing, was found to have a flexural strength of 7140 p.s.i. After being subjected to the post-cure of Example X, the bar was found to have a flexural strength of 7020 p.s.i. When subjected to a heat distortion test before post-curing, the bar was found to have a deflection of .007" at 400° C. Electrical properties of the bar were found to be as follows: power factor—0.0154, dielectric constant—5.1, and insulation resistance—110,000 megohms, after ninety-six hours at 40° C. and ninety percent relative humidity.

Heat distortion and flexural strength were determined by using the procedures specified in ASTM Test No. D648–45T and D790–49T, respectively.

As indicated hereinabove, the principal binder is a di, tri, or tetrafunctional silamine and mixtures thereof with or without an epoxy composition. It should be mentioned, however, that in special circumtances, it may be desirable to add a monofunctional silamine, which, by itself, will not polymerize or copolymerize but which may be used as a "chain stopper" to control the degree or extent of polymerization of the polyfunctional silamines.

It is possible that naturally occurring fillers may be found containing other reactive groups analogous to the hydroxyl group, enabling such fillers to be incorporated, likewise, with resinous binders of the type contemplated herein and to form a composition wherein the filler is chemically bound with the binder. Exemplary groups are: amino, carboxyl, and chlorine.

Many molded products obtainable from the new compositions contemplated herein have heat distortion temperatures of the order of 300° C. and retain their high heat distortion properties even after being subjected to an "aging" at 260° C. for two hundred and twenty hours. Further, products molded from these new compositions have been found to have relatively high flexural strengths which are, likewise, retained to a large degree after an aging process of the above mentioned type. Accordingly, these new compositions offer opportunities to produce a wide variety of products having not only improved properties at ordinary temperatures, but also having improved properties at elevated temperatures.

Having disclosed the invention and certain exemplary embodiments thereof, the same is intended to be limited only in accordance with the following claims.

We claim:

1. A moldable composition capable of being cured by heat and pressure including a binder comprising the polymeric reaction product of an ammoniacal compound, selected from a class consisting of ammonia and a primary amine, with a halosilane having the generic formula $$R_nSiHal_{4-n}$$

wherein "R" is a monovalent hydrocarbon radical and "n" is a number from 0–2, said reaction product being characterized by the presence of an

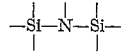

linkage as a part of its molecular structure; and an hydroxyl-containing inorganic filler, a reaction occurring between amino groups in said polymeric reaction product and the hydroxyl groups in said hydroxyl-containing inorganic filler.

2. A moldable composition as described in claim 1 wherein the halosilane is a chlorosilane.

3. A moldable composition as described in claim 2 wherein "R" is selected from the class consisting of monovalent alkyl and aryl radicals.

4. A moldable composition as described in claim 3 wherein the hydroxyl-containing inorganic filler is selected from the class consisting of asbestos and mica.

5. A moldable composition capable of being cured by heat and pressure including a binder comprising the polymeric reaction product of an ammoniacal compound, selected from the class consisting of ammonia and a primary amine, with a mixture of at least two chlorosilanes from the class consisting of $$R_2SiCl_2$$
$$RSiCl_3$$

and $$SiCl_4$$

wherein "R" is a monovalent hydrocarbon radical, said reaction product being characterized by the presence of an

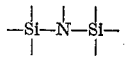

linkage as a part of its molecular structure; and an hydroxyl-containing inorganic filler, a reaction occurring between amino groups in said polymeric reaction product and the hydroxyl groups in said hydroxyl-containing inorganic filler.

6. A moldable composition as described in claim 5 wherein "R" is selected from the class consisting of monovalent alkyl and aryl radicals.

7. A moldable composition including a binder comprising a resinous polyepoxide and the polymeric reaction product of an ammoniacal compound, selected from the class consisting of ammonia and a primary amine, with a halosilane having the generic formula $$R_nSiHal_{4-n}$$

wherein "R" is a monovalent hydrocarbon radical and "n" is a number from 0–2, said reaction product being characterized by the presence of an

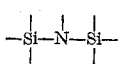

linkage as a part of its molecular structure; and an hydroxyl-containing inorganic filler, a reaction occurring between amino groups in said polymeric reaction product and the hydroxyl groups in said hydroxyl-containing inorganic filler.

8. A moldable compoistion as described in claim 7 wherein the halosilane is a chlorosilane and "R" is selected from the class consisting of monovalent alkyl and aryl radicals.

9. A moldable composition capable of being cured by heat and pressure including a binder comprising a resinous polyepoxide and the polymeric reaction product of an ammoniacal compound, selected from the class consisting of ammonia and a primary amine with a mixture of at least two chlorosilanes from the class consisting of $$R_2SiCl_2$$
$$RSiCl_3$$
and
$$SiCl_4$$

wherein "R" is a monovalent hydrocarbon radical, said reaction product being characterized by the presence of an

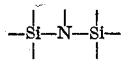

linkage as a part of its molecular structure; and an hydroxyl-containing inorganic filler, a reaction occurring between amino groups in said polymeric reaction product and the hydroxyl groups in said hydroxyl-containing inorganic filler.

10. A moldable composition as described in claim 9 wherein "R" is selected from the class consisting of monovalent alkyl and aryl radicals.

11. A moldable composition as described in claim 10 when said resinous polyepoxide is the reaction product of epichlorohydrin and a bisphenol.

12. A moldable composition capable of being cured by heat and pressure including a binder comprising a resinous polyepoxide and the polymeric reaction product of ammonia with a mixture of methyltrichlorosilane and dimethyldichlorosilane, said reaction product being characterized by the presence of an

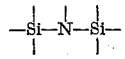

linkage as a part of its molecular structure; and an hydroxyl-containing inorganic filler, a reaction occurring between amino groups in said polymeric reaction product and the hydroxyl groups in said hydroxyl-containing inorganic filler.

13. A composition as described in claim 12 wherein said hydroxyl-containing inorganic filler is asbestos.

14. A composition as described in claim 13 wherein the chlorosilanes are present in said mixture in substantially equal molar proportions.

15. A moldable composition capable of being cured by heat and pressure including a binder comprising a resinous polyepoxide and the polymeric reaction product of ammonia with a mixture of dimethyldichlorosilane and phenyltrichlorosilane, said reaction product being characterized by the presence of an

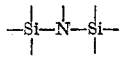

linkage as a part of its molecular structure; and an hydroxyl-containing inorganic filler, a reaction occurring between amino groups in said polymeric reaction product and the hydroxyl groups in said hydroxyl-containing inorganic filler.

16. A composition as described in claim 15 wherein said hydroxyl-containing inorganic filler is asbestos.

17. A composition as described in claim 15 wherein the chlorosilanes are present in said mixture in substantially equal molar proportions.

18. An article of manufacture molded from the composition of claim 1.

19. An article of manufacture molded from the composition of claim 5.

20. An article of manufacture molded from the composition of claim 7.

21. An article of manufacture molded from the composition of claim 9.

22. A composition of matter comprising the product of the reaction of (1) a resinous polyepoxide, (2) the polymeric reaction product of ammonia with a halosilane having the generic formula $$R_nSiHal_{4-n}$$

wherein "R" is a monovalent hydrocarbon radical and "n" is a number from 0-2, said reaction product being characterized by the presence of an

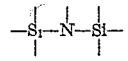

linkage as a part of its molecular structure; and (3) an hydroxyl-containing inorganic filler, a reaction occurring between amino groups in said polymeric reaction product and the hydroxyl groups in said hydroxyl-containing inorganic filler.

References Cited in the file of this patent

UNITED STATES PATENTS

| | | |
|---|---|---|
| 2,566,363 | Pedlow et al. | Sept. 4, 1951 |
| 2,579,418 | Cheronis | Dec. 18, 1951 |
| 2,773,048 | Formo | Dec. 4, 1956 |

FOREIGN PATENTS

| | | |
|---|---|---|
| 684,662 | Great Britain | Dec. 24, 1952 |
| 537,768 | Belgium | Oct. 29, 1955 |